Figure 1:
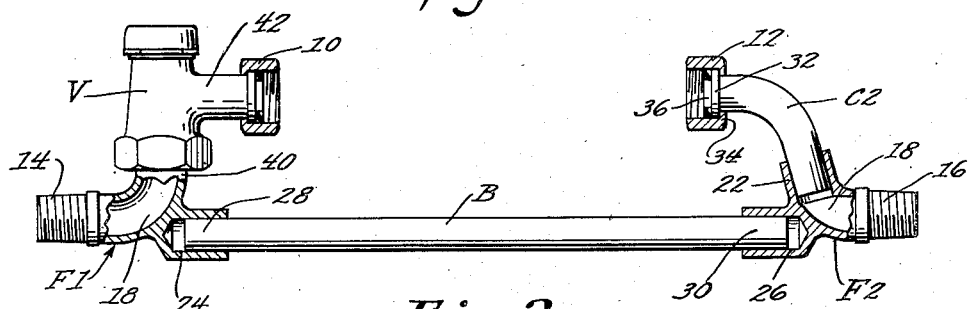

Nov. 27, 1951  F. H. MUELLER ET AL  2,576,630
ADJUSTABLE METER SUPPORT
Filed Jan. 19, 1948

Inventors
Frank H. Mueller &
Walter J. Bowan.

By Cushman, Darby & Cushman
Attorneys

Patented Nov. 27, 1951

2,576,630

UNITED STATES PATENT OFFICE 2,576,630

ADJUSTABLE METER SUPPORT

Frank H. Mueller and Walter J. Bowan, Decatur, Ill., assignors to Mueller Co., Decatur, Ill., a corporation of Illinois Application January 19, 1948, Serial No. 3,128

3 Claims. (Cl. 285—3)

The present invention relates to supports for meters and the like. It is the purpose of the invention to provide a combination of separately fabricated parts which can be accurately assembled for the support of the meter with pronounced convenience and at minimum cost. The elements forming the assembly or combination for supporting the meter are of simple nature, but the assembled product is rugged and accurate in its alignment, whereby strains on the parts are reduced, and rupturing of joints in use, as sometimes encountered in the art, is avoided. One of the important objects of the invention is to provide a supporting assembly of the character referred to, wherein the independent elements which form the assembly are designed to cooperate with each other in such manner that the assembly may be erected and bonded together with the connecting means for the meter nipples properly spaced to receive said nipples when the meter is positioned in the assembly at the point of use.

Figure 2:
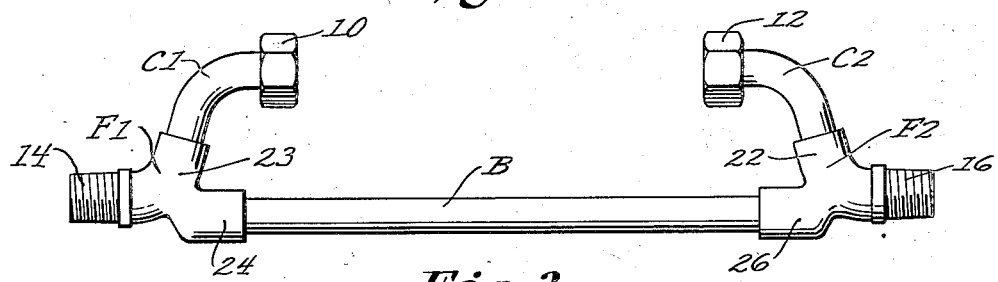
Figure 3:
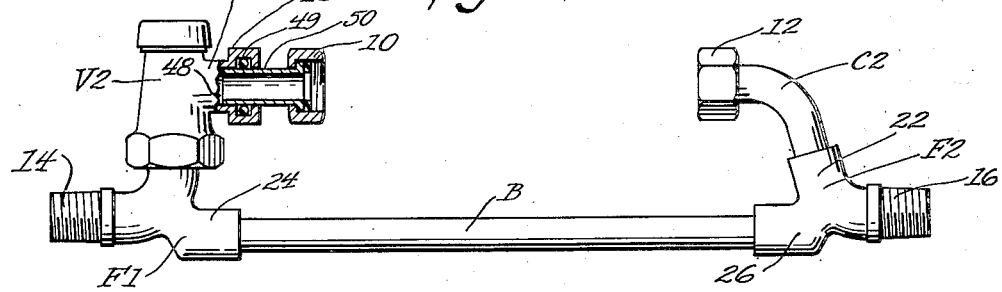
Figure 4:
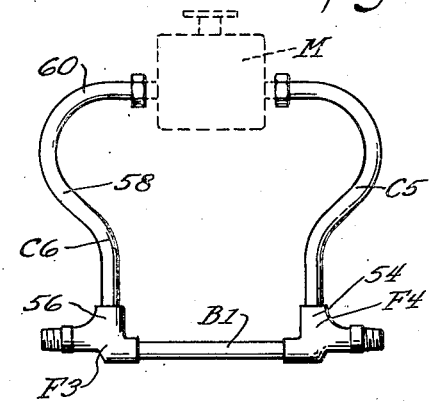
Figure 5:
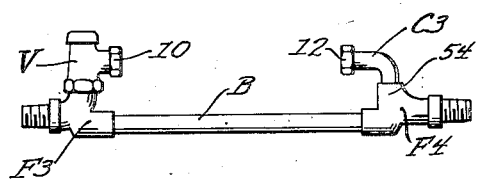

In the drawings, which are illustrative of several forms which the invention may take:

Figure 1 is a side elevational view of one form of the invention, partly in section, Figure 2 is a side elevational view of an assembly similar to Figure 1, but with the angle stop valve which forms a part of the assembly in Figure 1 omitted, Figure 3 is a side elevational view of a further modification of the invention, partly in section, illustrating a particular manner in which the connection to the meter may be adjustably effected by a special connection on the angle stop valve, and Figures 4 and 5 are similar side elevational views, showing further modifications of the invention.

Referring to Figure 2, the assembly comprises separately fabricated supply and service fittings F1 and F2, respectively, a separately fabricated supporting bar B and separately fabricated flexible bent connecting conduits C1 and C2. On the inner ends of the connecting conduits C1 and C2, are suitable attaching means in the form of nuts 10 and 12, said attaching means being presented to the conventional threaded aligned nipples on the meter (not shown but of construction well known in the art) whereby the meter may be connected between the conduits C1 and C2 and supported thereby above the supporting bar B.

The fittings F1 and F2 are provided with outer attaching means 14 and 16, respectively, whereby the aligned ends of the supply and service mains may be connected thereto, in a manner well known in the art, the manner in which this connection may be effected being disclosed in a copending application Serial No. 794,521, filed by Frank H. Mueller on December 30, 1947, entitled "Support for Meters and the Like," now Patent 2,510,512, issued June 6, 1950. As shown in Figure 1, there is an angularly directed closed fluidway 18 extending through each fitting, for instance, from the open, outer attaching means 16 to the angularly and upwardly directed open socket 22. The fittings F1 and F2 may be constructed in any conventional manner, such as by casting from brass or the like, the design being simple yet effective in its application to the assembly described herein.

The fittings F1 and F2 are further provided with inwardly directed sockets 24 and 26, extending with their axes parallel to the axes of the attaching means 14 and 16, but in the opposite direction therefrom. The supporting bar B may take the form of a separately fabricated, galvanized pipe section having ends 28 and 30 (Figure 1) which slidably fit into the respective sockets 24 and 26, and when adjusted therein to properly space the fittings from one another in a horizontal direction, said ends are bonded in their sockets as by soldering, as will be apparent to those skilled in the art. The sockets 24 and 26 are of such length as to permit horizontal adjustment of the fittings with respect to one another before bonding. It will be noted that these sockets are displaced below the outer attaching means 14 and 16, in order to receive the meter, although they might be in line with said attaching means depending on the size and design of the meter, and the dimensions of the other parts which make up the assembly. In any event, the axes of the sockets and their respective outer attaching means are in the same vertical plane, and similarly, the axis of the socket 22 is in the same vertical plane with its corresponding outer attaching means and supporting bar socket, thus providing a simple and easily fabricated fitting. It will also be understood that the curved axes of the conduits C1 and C2 and the axes of the inner attaching means 10 and 12 are also in the same vertical plane with the other parts just referred to.

In certain prior art practices, it has been the custom to dispose the axis of the socket 22 and its corresponding opposite socket 23, in a horizontal direction, whereby horizontal adjustment of the inner attaching means 10 and 12 was possible before bonding the connecting conduits to the fitting, but in such constructions, vertical adjustment of the inner attaching means, for proper alignment, was precluded, at least without tilting the inner attaching means to an undesirable extent. It will be observed that the axes of the sockets 22 and 23 are angularly and upwardly directed, i. e., at an angle between horizontal and vertical, whereby the conduits C1 and C2, or any one of them, may be adjusted in their sockets prior to bonding, in order to establish the proper vertical alignment of the inner attaching means 10 and 12. Of course, by reason of the angular presentation of the sockets 22 and 23, as in Figure 2, adjustment of the conduits in their sockets will provide resulting adjustments of the inner attaching means in both horizontal and vertical directions, whereby exact alignment of the inner attaching means with respect to the nipples of the meter may be achieved.

Referring again to Figure 1, it will be noted that the inner end of the conduit C2 is provided with an outwardly extending circular connecting flange 32, and the nut 12 is provided with a similar flange 34, whereby a gasket 36, within the nut 12, may be tightly forced against the outer end of the threaded nipple of the meter and against the inner side of the flange 32, resulting in a secure and fluid-tight attachment to the meter. The manner of effecting this inner attachment, as just described, is substantially identical with the manner of attachment to the meter nipples in the various other embodiments of the invention, as illustrated in other figures of the drawing.

It will be observed that by reason of the upwardly directed socket 22 in Figure 1, and in the other figures, it is possible to employ a connecting conduit C2 with only one bend therein.

In erecting a meter supporting assembly of the type described above, one of the conduits C1 may be properly positioned in its socket, and soldered therein, after which the fittings F1 and F2 are loosely connected together by inserting opposite ends of the connecting bar B into the respective sockets 24 and 26, but without bonding the bar in its sockets or without bonding the other connecting conduit in its socket, but merely loosely positioning said conduit therein. A spacer pipe (not shown) is then rigidly coupled between the inner attaching means 10 and 12, this pipe being of simple design, but of length equal to the distance between the outer ends of the meter nipples to be installed, and equipped with connecting threads at its ends identical with the threads of said nipples, the use of such a spacer pipe being apparent to those skilled in the art, and described in the said Frank H. Mueller Patent No. 2,510,512, referred to above. When the spacer pipe has thus been connected to fix or govern the assembly of the parts, the outer end of the remaining unbonded connecting conduit may then be soldered in its fitting, and the opposite ends of the supporting bar B may likewise be soldered in their sockets.

In Figure 1, the assembly, as just described, is modified only to the extent that the upper end 40 of the fitting F1 is vertically directed, and an angle stop valve V of conventional construction, for instance as described in the said Frank H. Mueller Patent No. 2,510,512, is attached as by threading onto the part 40 of the fitting. In this assembly, the valve V may be considered as a part of the fitting, and its hollow interior a part of the fluidway 18 through the fitting, there being a conventional valve member within the valve housing to control the flow of fluid through the fitting. The valve V is provided with a tubular extension 42 which is directed inwardly toward the position of the meter, and the inner attaching means 10 is mounted on the flanged end of the tubular portion 42 to effect the connection with the nipple of the meter as previously described. The axis of the tubular portion 42 is parallel to the axis of the outer attaching means 14, and the respective axes lie in the same vertical plane. With this design, erection of the assembly is accomplished by first screwing the stop valve V onto the top of the fitting F1 with its tubular portion 42 directed inwardly. The connecting conduit is loosely disposed in its socket 22 and the ends of the supporting bar are loosely disposed in their respective sockets. The spacer pipe previously mentioned is then rigidly coupled between the inner attaching means 10 and 12, and thereafter, the bonds are effected by soldering conduit C2 in the socket 22, and the ends of supporting bar B in the respective sockets 24 and 26.

In Figure 3, the component parts and the manner of assembly are the same as previously described, but the angle stop valve V2 is provided with an inwardly directed tubular extension 44 having a wide flange 46 on the end thereof, the tubular portion and flange providing an outlet passage 48 which is surrounded by an annular square cut channel 49. An O-ring is positioned in this annular channel, same being of design and operation now well known in the art. The O-ring consists of a ring of rubber or the like, which is circular in cross section, and is continuous. There is an extension tube 50 slidably mounted in the conduit 48, and on the end of this extension tube is the inner attaching means 10 previously described. The O-ring is of such design as to snugly fit against the outside of the extension tube 50 and of such thickness as to also bear against the outer wall of the annular channel 49, but this channel is somewhat longer axially of the tubular extension 50 than the diameter of the O-ring. Any fluid under pressure passing outwardly from the valve V2 and around the tubular extension 50 will enter the channel 49, and will exert pressure against the O-ring to force it radially inwardly against the tubular extension 50 as well as axially inwardly against the outer wall of the annular channel 49, thus securely sealing the parts against any escape of pressure, the construction providing for adjustment of the tubular extension 50 in the outlet 48 as desired in order to attach the inner connecting means 10 to the nipple on the meter. In this design, and in the manner previously described, the connecting conduit C2 may be properly adjusted in its socket 22 before bonding therein, particularly to present the inner connecting means 12 in a proper position vertically to the opposite inner connecting means 10. Overall horizontal spacing of the two inner connecting means may be effected by the adjustment of the supporting bar B prior to bonding, it being apparent that the O-ring seal as described, will permit a final adjustment of the inner connecting means 10 into position to attach to the nipple of the meter.

Referring to Figure 5, corresponding fittings F3 and F4 are illustrated, the fitting F4 having a socket 54, the axis of which is vertically directed, with respect to the axis of the outer attaching means on this fitting, but in the same vertical plane therewith. In this design the connecting conduit C3 has a right angle inward bend to properly present the inner attaching means 12 to the opposite inner attaching means on the valve V, the vertical socket 54 providing for vertical adjustment of the conduit C3, proper horizontal adjustment of the inner attaching means being accomplished by the use of a spacer pipe, as described, prior to the soldering of the ends of the supporting bar B in its sockets in the respective fittings. However, if necessary, the flexible conduit C3 may be more easily bent, as a final adjustment, than in the case of the conduits C1 and C2, to properly position the inner attaching means 12 with respect to the nipple of the meter. It will be understood, of course, that the design of Figure 5 might be modified like that of Figure 2 to omit the stop valve V, providing the fitting F3 with a vertically directed socket identical with socket 54, and with an inwardly bent connecting conduit identical with the conduit C3, the manner of assembly being apparent from the descriptions previously given.

The above modification of the Figure 5 design is suggested in Figure 4 wherein the fittings F3 and F4 are provided with vertically directed sockets 54 and 56. In this modification, the supporting pipe or bar B1 may be of shorter length than the supporting bars previously mentioned, and the connecting conduits C5 and C6 are first bent outwardly at 58 and thence inwardly at 60, to connect with the nipples of the meter M as illustrated in this figure. The erecting of this assembly will be apparent from the descriptions previously given. Horizontal adjustment is made with respect to the supporting bar B1 prior to soldering the latter in the fittings, and thereafter, the connecting conduits C5 and C6 may be easily bent inwardly to effect any required horizontal adjustment to properly align and space the inner attaching means.

It will be understood that the invention is not confined to the precise combinations disclosed in the several figures, and the sub-assemblies at the ends of the supporting bar may be substituted for one another to obtain various desired combinations.

It will be understood that in the various embodiments described, it is preferable to have the axes of all of the attaching means and sockets referred to, in the same vertical plane.

While a galvanized pipe is convenient and economical for use as the supporting bar, other pieces of conventional equipment might be used in its stead. In general, a galvanized pipe is employed to properly space the fittings, horizontally, and the connecting conduits are manipulated in their sockets, at least at one end of the assembly, to effect the final vertical adjustment, or final vertical and horizontal adjustment. The connecting conduits should be fabricated from material which may be easily bent, such as copper, and at their outer ends, they are slidably mounted in their sockets, but do not extend to any substantial distance into their fittings, and do not extend through their fittings in such manner as to preclude the adjustments as described, without tilting the inner attaching means.

As will be observed, the inner attaching means for the fitting at one end of the assembly may be on a rigid extension of the valve, or on an adjustable pipe extending from the valve, or on the end of a flexible conduit in instances were the valve is omitted. In the modification of Figure 3, the extension 50 and the O-ring assembly, provides a useful fluid-tight slip joint. The copper connecting conduits form only a part of the change in direction of the fluidway from the end of the outer attaching means to the end of the corresponding inner attaching means.

It will be obvious that we have provided an assembly of simple parts, which are economical in their manufacture, but which are capable of exact adjustment in their erection to provide a rugged and accurate support for a meter.

We claim:

1. Apparatus for setting meters and the like which have opposite aligned inlet and outlet nipples, comprising separately fabricated supply and service fittings each having outer attaching means adapted to be oppositely and horizontally directly to secure to the aligned ends of supply and service mains, each of said fittings carrying a horizontally directed inner attaching means displaced above its outer attaching means, each of said fittings having inwardly presented support sockets adapted to be aligned with one another, a separately fabricated supporting pipe section having opposite ends bonded in said support sockets and formed for adjustment therein prior to bonding to properly space said fittings in a horizontal direction with respect to one another, at least one of said fittings having a cylindrical socket whose axis is directed upwardly and a flexible conduit having an inward bend therein bonded at its outer end in said last named socket and carrying at its free end the inner attaching means of said fitting, said conduit having cooperating means at its outer end for adjustment in said last-named socket prior to bonding to adjust its attaching means vertically for alignment with the inner attaching means on the opposite fitting, said supporting pipe section being spaced vertically from said inner attaching means a sufficient distance to permit installation of a meter above said pipe section with its nipples secured between said inner attaching means.

2. Apparatus for setting meters and the like which have opposite aligned inlet and outlet nipples, comprising separately fabricated supply and service fittings each having outer attaching means adapted to be oppositely and horizontally directed to secure to the aligned end of supply and service mains, each of said fittings carrying a horizontally directed inner attaching means displaced above its outer attaching means, each of said fittings having inwardly presented support sockets adapted to be aligned with one another, a separately fabricated supporting pipe section having opposite ends bonded in said support sockets and formed for adjustment therein prior to bonding to properly space said fittings in a horizontal direction with respect to one another, at least one of said fittings having a cylindrical socket therein whose axis is presented inwardly and upwardly at an angle between horizontal and vertical and a flexible conduit having a single inward bend therein bonded at its outer end in said last named socket and carrying at its free end an inner attaching means of said fitting, said conduit having cooperating means at its outer end for adjustment in said last-named socket prior to bonding to adjust its attaching means vertically for alignment with the inner attaching means on the opposite fitting, said supporting pipe section being spaced vertically from said inner attaching means a sufficient distance to permit installation of a meter above said pipe section with its nipples secured between said inner attaching means.

3. Apparatus for setting meters and the like as set forth in claim 1 wherein said inner attaching means on one of said fittings comprises a flanged outlet directed inwardly in a horizontal direction with an annular channel in said flange around said outlet carrying an O-ring therein, and a short pipe section slidably mounted in said outlet and sealed by said O-ring, said short pipe section having means at its inner end for effecting the connection to one of the nipples on the meter.

FRANK H. MUELLER.
WALTER J. BOWAN.

REFERENCES CITED

The following references are of record in the file of this patent:

UNITED STATES PATENTS

| Number | Name | Date |
|---|---|---|
| 1,988,003 | Ford | Jan. 15, 1935 |
| 2,125,380 | Krueger | Aug. 2, 1938 |
| 2,438,497 | Ford | Mar. 30, 1948 |